United States Patent
Magana

(10) Patent No.: US 7,692,757 B2
(45) Date of Patent: Apr. 6, 2010

(54) WAFER SCALE FABRICATION OF LIQUID CRYSTAL ON SILICON LIGHT MODULATION DEVICES

(75) Inventor: John F. Magana, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 993 days.

(21) Appl. No.: 10/903,683

(22) Filed: Jul. 30, 2004

(65) Prior Publication Data

US 2006/0023155 A1     Feb. 2, 2006

(51) Int. Cl.
G02F 1/1333    (2006.01)
G02F 1/13      (2006.01)
G02F 1/1339    (2006.01)

(52) U.S. Cl. ............... 349/158; 349/160; 349/187; 349/153

(58) Field of Classification Search .............. None
See application file for complete search history.

(56) References Cited

U.S. PATENT DOCUMENTS 5,691,794 A * 11/1997 Hoshi et al. ............ 349/158
6,492,195 B2 * 12/2002 Nakanishi et al. ........... 438/106
2002/0159020 A1 * 10/2002 Sojourner et al. ........... 349/189
2004/0017537 A1    1/2004 Magana et al.

FOREIGN PATENT DOCUMENTS

| JP | 53-6055    | 1/1978  |
| JP | 2003-5161  | 1/2003  |
| JP | 2004-279630| 10/2004 |

* cited by examiner

*Primary Examiner*—David Nelms
*Assistant Examiner*—Lucy P Chien
(74) *Attorney, Agent, or Firm*—Kevin A. Reif

(57) ABSTRACT

A liquid crystal over silicon light modulator may include a trenched cover glass. The trenched cover glass enables the provision of regions between adjacent dice on the wafer level. These regions facilitate sealing of the individual modulators and dicing of the individual modulators from the overall wafer. In some embodiments this may reduce contamination of the liquid crystal with the sealing material and losses at the dicing stage.

6 Claims, 7 Drawing Sheets

WAFER SCALE FABRICATION OF LIQUID CRYSTAL ON SILICON LIGHT MODULATION DEVICES

BACKGROUND

This invention relates generally to light modulation devices.

A silicon light modulator is an electro-optical device with a liquid crystal material driven by electronics located under each pixel. High resolution, very large scale integration silicon light modulation devices have practical applications, including rear projection television light engines, computer monitors, and direct view personal viewing devices, to mention a few examples.

Actuation of individual pixel elements in a liquid crystal on silicon microdisplay is accomplished by modulation of the electric field applied to the liquid crystal material in the gap between a pixel electrode and a common electrode. Control of the gap between the pixel and common electrode is critical to electro-optical performance.

Existing modulators suffer from high assembly losses in the dicing step, liquid crystal contamination by sealing epoxy, and losses in the wire bond attach step.

Thus, there is a need for alternate ways of forming liquid crystal on silicon light modulators.

DETAILED DESCRIPTION

Figure 1:
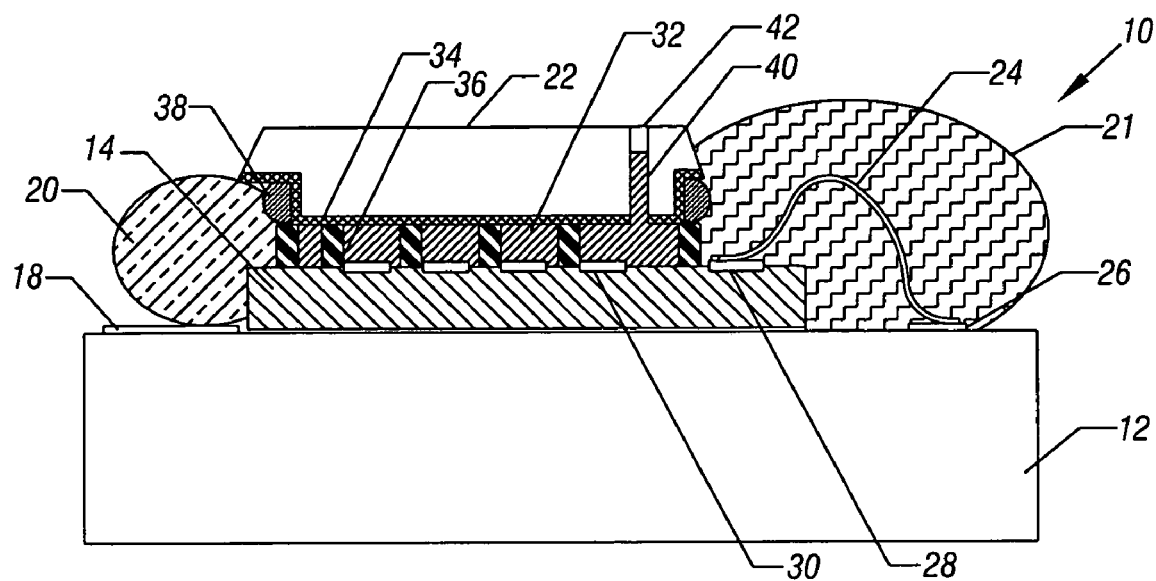
FIG. 1 is an enlarged, cross-sectional view of one embodiment of the present invention.
Figure 2:
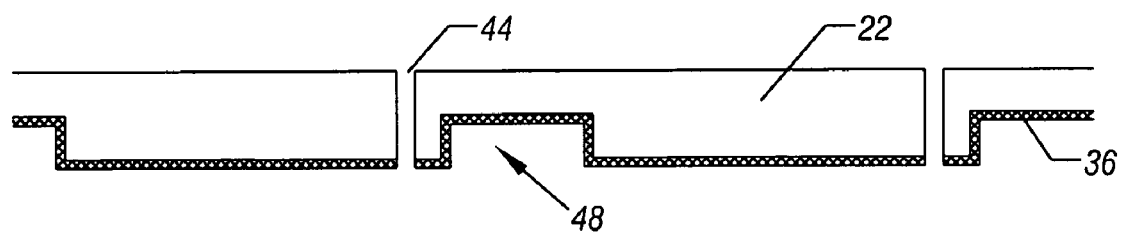
FIG. 2 is an enlarged, cross-sectional view of a top plate at the wafer level in accordance with one embodiment of the present invention.

Referring to FIG. 1, a liquid crystal on silicon (LCOS) microdisplay silicon light modulator 10 includes a packaging surface 12, a silicon substrate 14, a wire bond pad 18, a conductive epoxy 20, an indium tin oxide (ITO) coated glass 22, a wire 24, a wire bond pad 26, and another wire bond pad 28 on the silicon substrate 14. A potting compound 21 protects the wire bonds 24. A plurality of pixel electrodes 30 are formed on the silicon substrate 14. A liquid crystal material 32 is trapped between the glass 22, the silicon substrate 14, the end-most spacers 34, and the sealing epoxy gasket 38. A layer of transparent conductive material 36, such as indium tin oxide (ITO) is formed on the glass 22. A fill hole 40 is provided for filling the modulator 10 with liquid crystal material 32 and a seal 42 is provided to prevent outflow of liquid crystal material.

Circuitry in the silicon substrate 14 selectively operates the electrodes 30 to actuate particular cells between electrode 30 and the overlying electrode 32. As a result of electrical actuation, different images can be visible through the glass 22.

Fabrication of the modulator 10 may begin by forming, on a wafer scale, a grooved cover glass 22 coated with indium tin oxide 36. Grooves 48 are formed at periodic intervals to separate out of the wafer, one adjacent modulator 10 from the next. Filling holes 44 are provided along the length of the glass 22.

Figure 3:
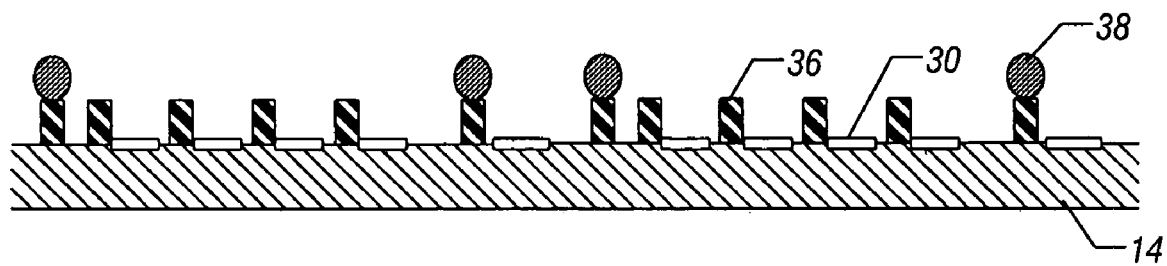
FIG. 3 is an enlarged, cross-sectional view of the bottom plate at the wafer level in accordance with one embodiment of the present invention.

The silicon substrate 14, shown in FIG. 3, in wafer form, may include a plurality of pixel electrodes 30 and integrated spacers 36 formed thereon. The spacers 36 define the cell size between the silicon substrate 14 and the cover glass 22. Certain spacers 36 are covered in a sealing epoxy ball 38.

Figure 4:
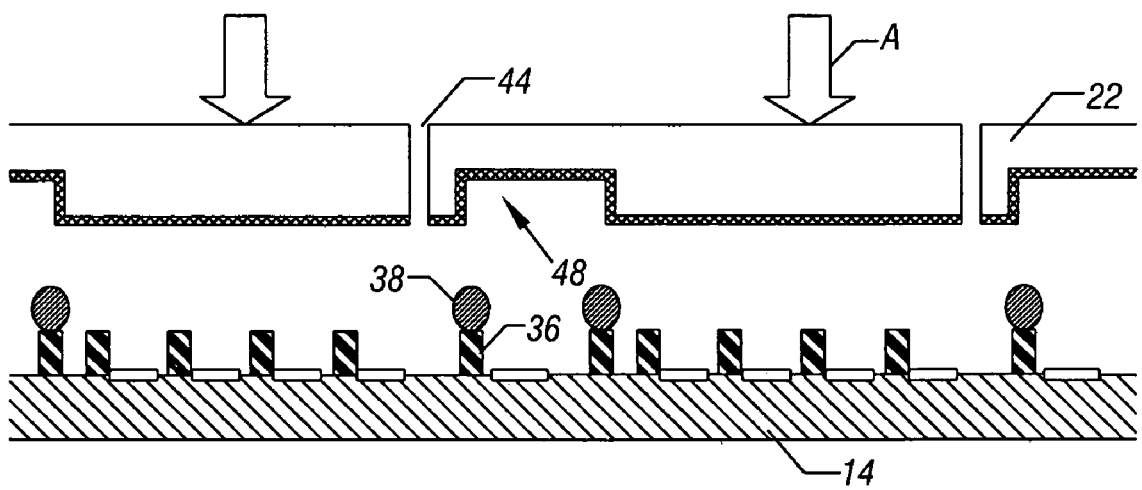
FIG. 4 is an enlarged, cross-sectional view of the assembly of top and bottom plates in accordance with one embodiment of the present invention.

Referring now to FIG. 4, the cover glass 22, on a wafer scale, may be positioned on the wafer scale substrate 14. The grooves 48 line up with the sealing epoxy gasket 38 covered spacers 36.

Figure 5:
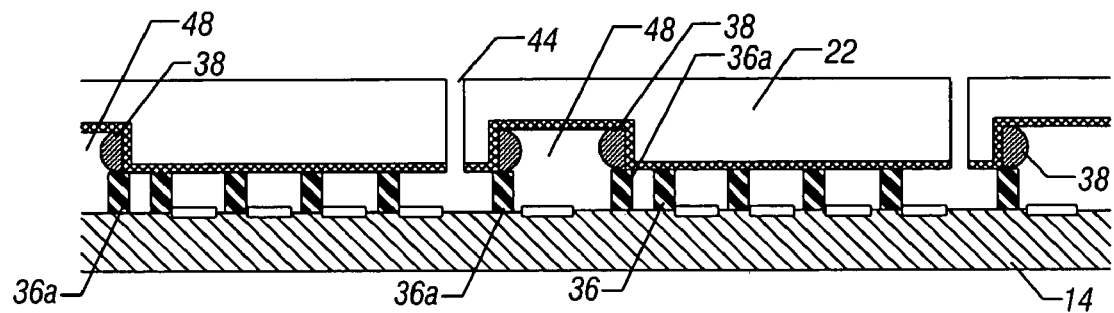
FIG. 5 is an enlarged, cross-sectional view of the attachment of top and bottom plates in accordance with one embodiment of the present invention.
Figure 6:
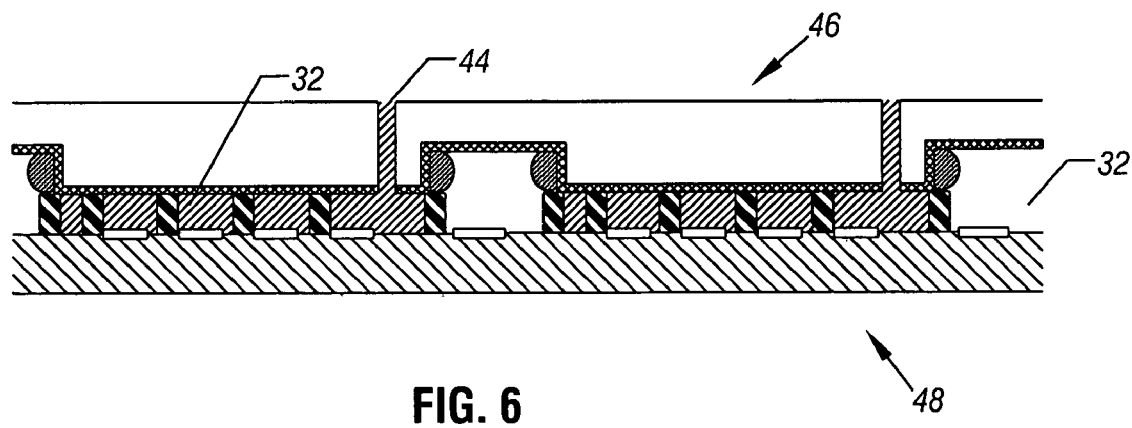
FIG. 6 is an enlarged, cross-sectional view of filling one embodiment of the present invention.

As shown in FIG. 5, the cover glass 22 may subsequently be adhesively secured to the substrate 14 through the sealing epoxy gasket 38 and integrated spacers 36. Upon assembly, the regions between successive grooves 48 are effectively sealed from the grooves 48 and from adjacent modulators by the end spacer 36a and the epoxy ball 38 thereon.

Figure 7:
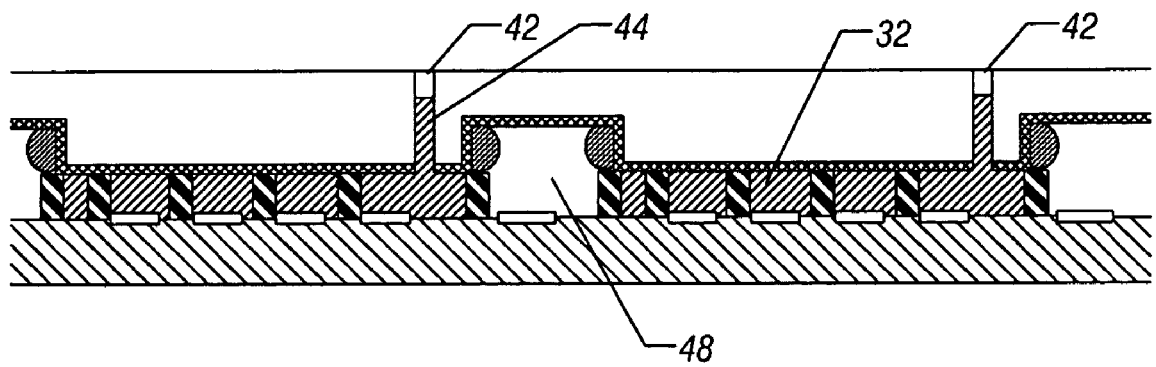
FIG. 7 is an enlarged, cross-sectional view of sealing one embodiment of the present invention.

The entire structure, on the wafer scale, is then filled through the openings 44 by injecting liquid crystal material 32 into the sealed region between adjacent grooves 48. Thereafter, as shown in FIG. 7, the openings 44 may be closed with a sealant 42.

Figure 8:
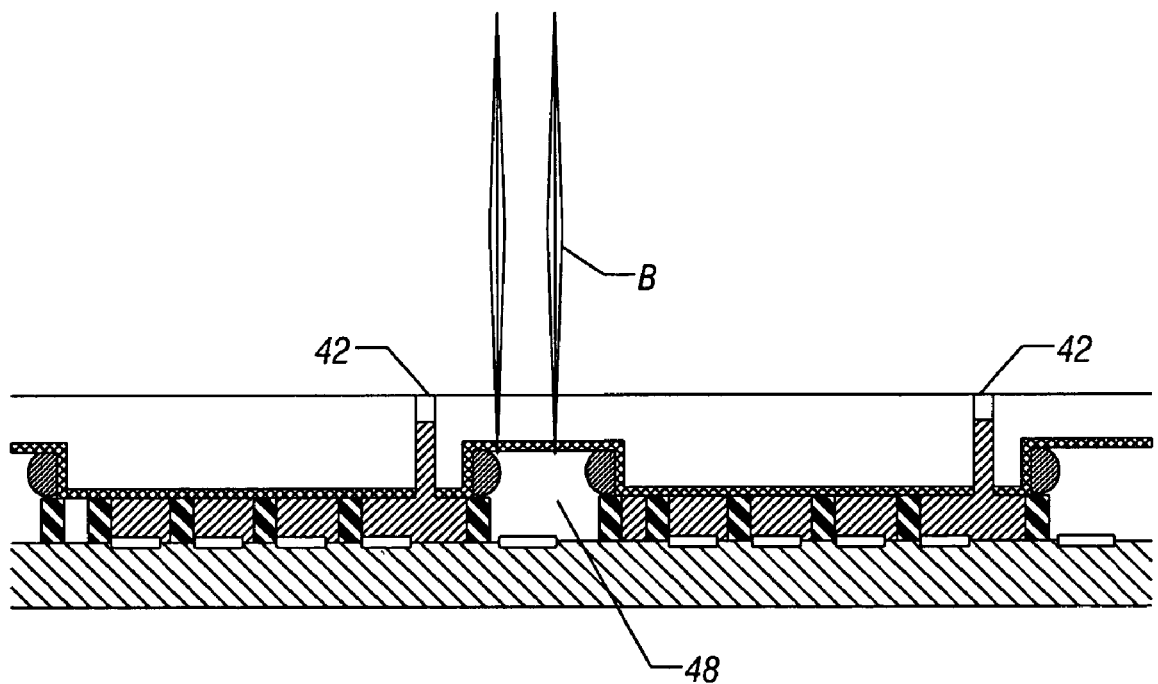
FIG. 8 is an enlarged, cross-sectional view of dicing one embodiment of the present invention.

Next, individual modulators 10 may be diced from the wafer using the dicing apparatus indicated at B in FIG. 8. The dicing is done into the grooved regions 48 between modulators 10. The use of the grooved regions 48 provides for alignment and ready location of the dicing location to avoid damaging the individual modulators. In particular, the provision of what now appears to be an upstanding surface feature enables easy location of the dicing area and provides room for dicing without damaging components.

Figure 9:
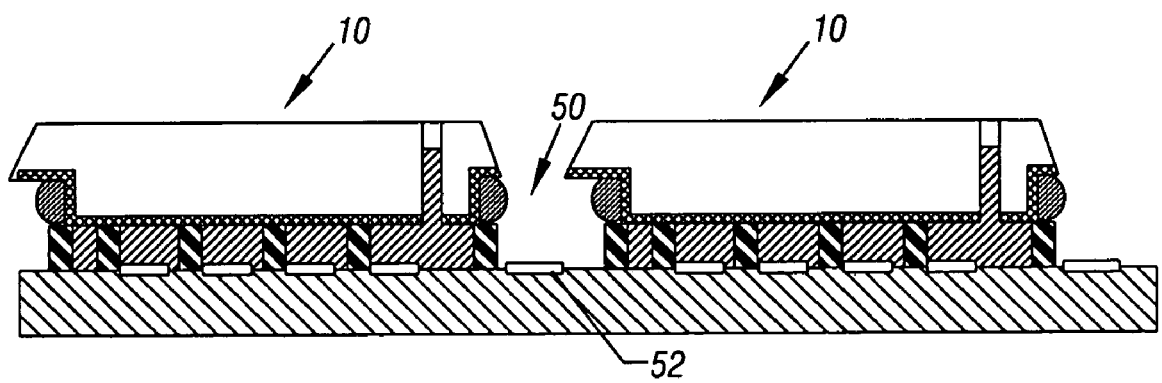
FIG. 9 is an enlarged, cross-sectional view showing the result of dicing in accordance with one embodiment of the present invention.
Figure 10:
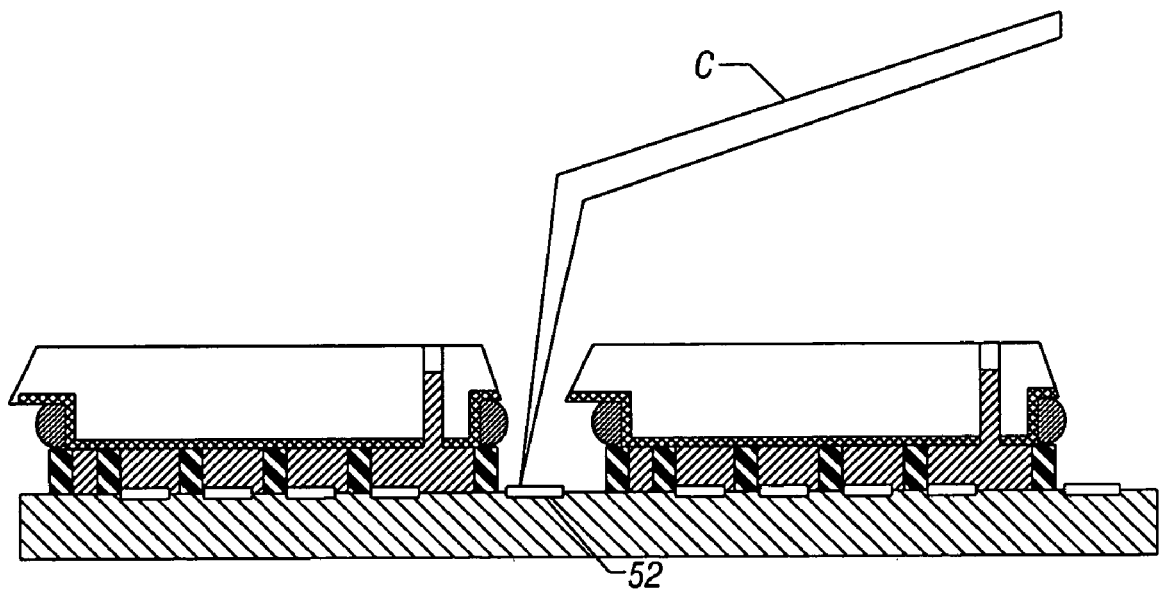
FIG. 10 is an enlarged, cross-sectional view showing wafer probing in accordance with one embodiment of the present invention.

As a result, segregated modulators 10 may be formed by a dicing hole 50, shown in FIG. 9, between adjacent modulators 10. An electrode 52 is now exposed between adjacent modulators 10. The electrode 52 may be accessed by a probing tool C for probe level testing of the devices 10 before packaging, as shown in FIG. 10. Bad die may be appropriately marked to prevent further application and use.

Figure 11:
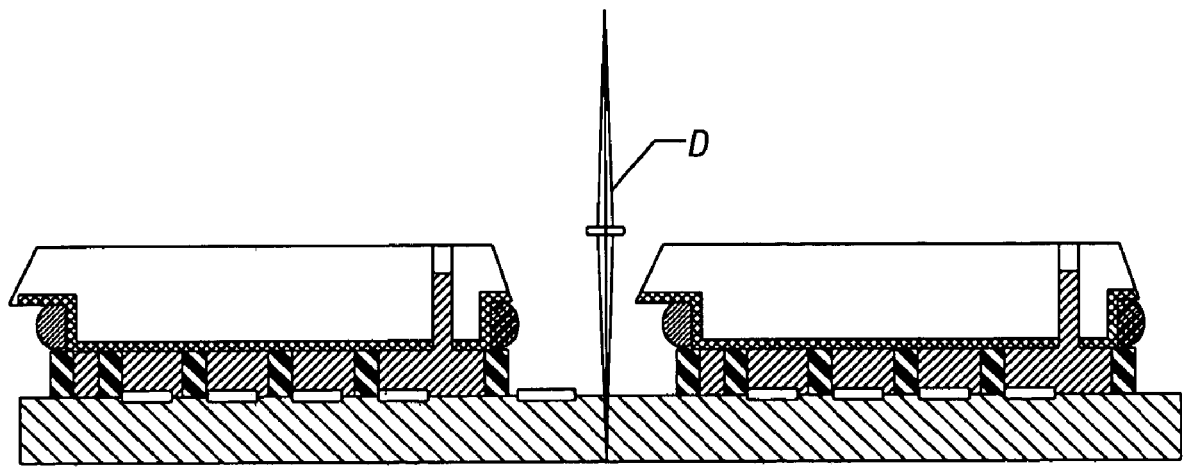
FIG. 11 is an enlarged, cross-sectional view showing wafer dicing in accordance with one embodiment of the present invention.
Figure 12:
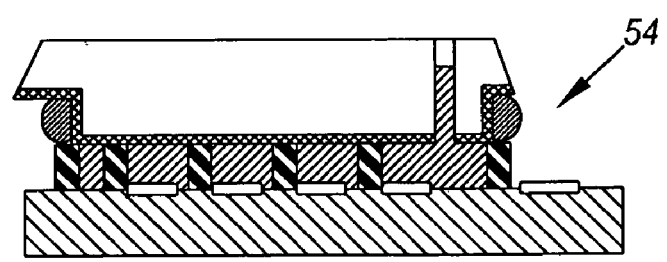
FIG. 12 is one embodiment of the unpackaged modulator in accordance with one embodiment of the present invention.

Subsequently, the individual dies are separated from the rest of the silicon substrate 14, as shown in FIG. 11, using a dicing tool D. The resulting die 54 is shown in FIG. 12.

Figure 13:
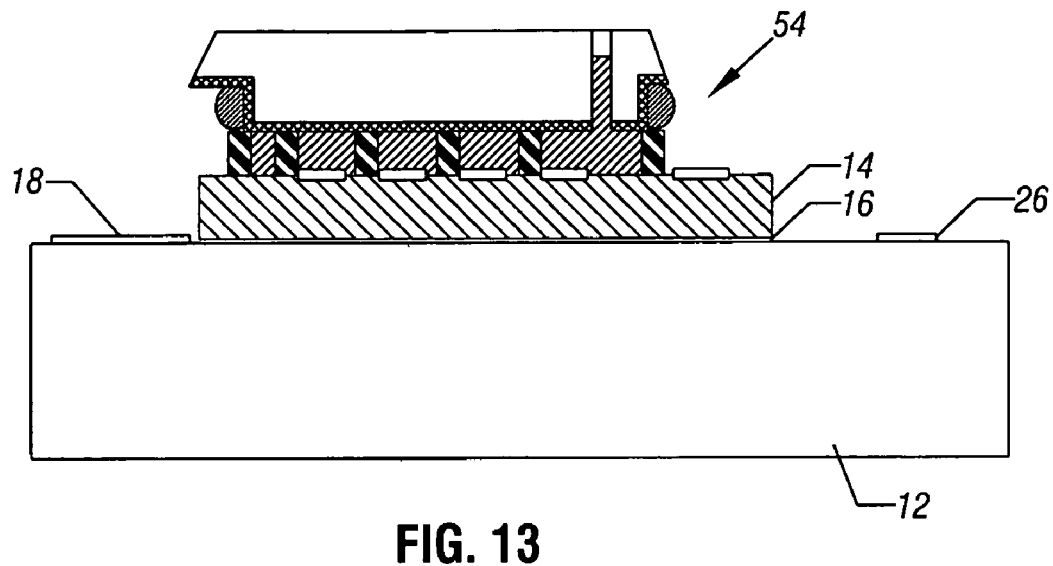
FIG. 13 is an enlarged, cross-sectional view of packaging one embodiment of the present invention.
Figure 14:
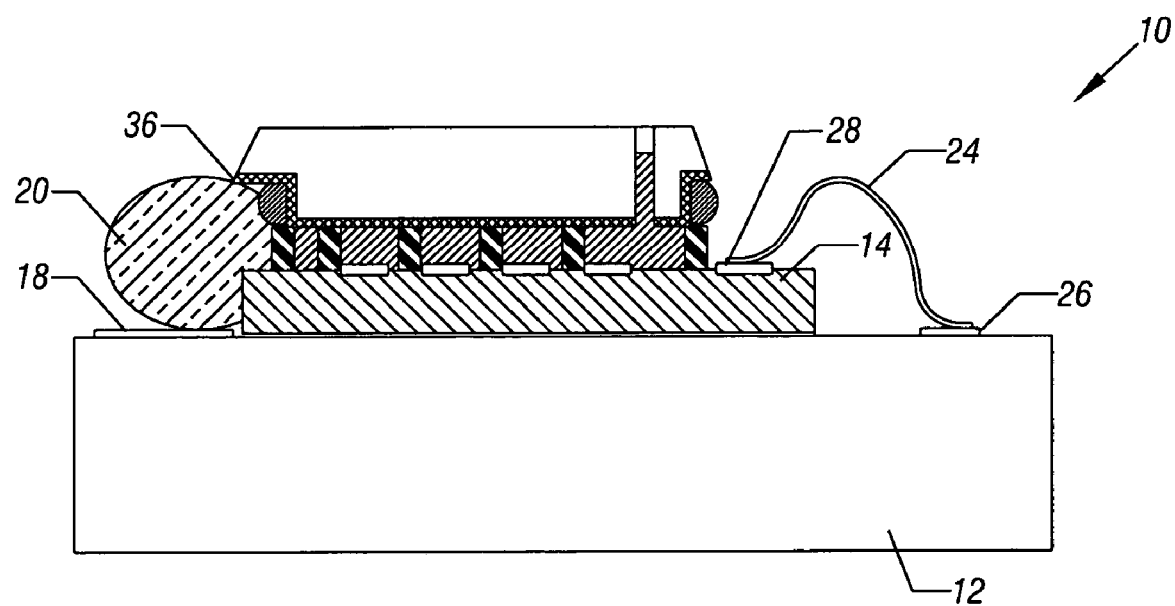
FIG. 14 is an enlarged, cross-sectional view of the embodiment shown in FIG. 13 after further processing.

The die 54 may then be placed on a packaging surface 12 as shown in FIG. 13. The surface 12 may have already formed thereon the wire bond pads 18 and 26. As shown in FIG. 14, a conductive epoxy 20 couples the pad 18 to the indium tin oxide layer 36. A wire bond 24 may be applied from the pad 28 on the substrate 14 to the pad 26 on the packaging surface 12. Thereafter, the wire bond 24 may be potted with material 21 to achieve the structure shown in FIG. 1.

In accordance with some embodiments of the present invention, losses in the dicing step may be reduced by providing the trenched structure in the glass plate 22. Contamination of the liquid crystal material 32 by the sealing epoxy gasket 38 may be reduced by placing the sealing epoxy gasket 38 outbound of the sealed region that includes the liquid crystal material 32. Losses in the wire bond attach step may be reduced by enabling early testability in some embodiments of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A semiconductor structure comprising:
    a first semiconductor wafer to form a plurality of cover glasses of liquid crystal over silicon light modulator, said first semiconductor wafer including a plurality of trenches defining cover glasses;
    a second semiconductor wafer to form a plurality of bottom plates of liquid crystal over silicon light modulators, said first wafer secured to said second wafer with said trenches opening towards said second wafer, wherein each of the plurality of spaced trenches forms a location to separate one silicon light modulator from an adjacent silicon light modulator; and
    hollow regions adjacent said trenches to be filled with a liquid crystal material.

2. The structure of claim 1 including a plurality of spacers extending between said first and second wafers.

3. The structure of claim 2 wherein a pair of said spacers are secured on opposed sides of a trench.

4. The structure of claim 3 including an adhesive securement between said pair of spacers and said trench.

5. The structure of claim 4 wherein said securement is epoxy, said epoxy being positioned in said trench.

6. The structure of claim 5 including a fill hole through said first wafer to enable the region between said first and second wafers and between two adjacent trenches to be filled with the liquid crystal material.

* * * * *